June 23, 1970     J. O. GALLANT ET AL     3,516,135
ROLL WITH VIBRATION DAMPING MEANS
Filed April 16, 1968     2 Sheets-Sheet 1
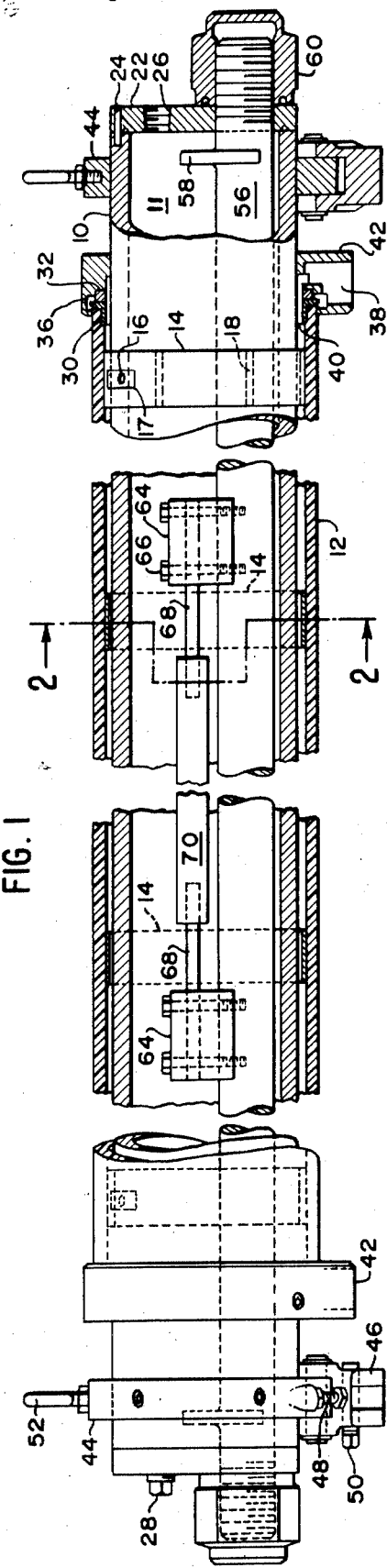
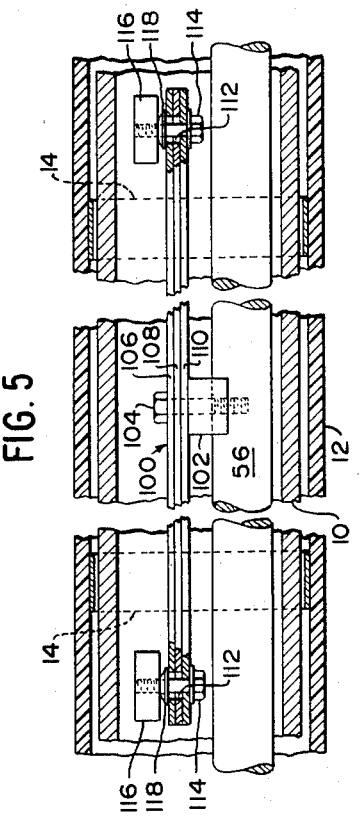
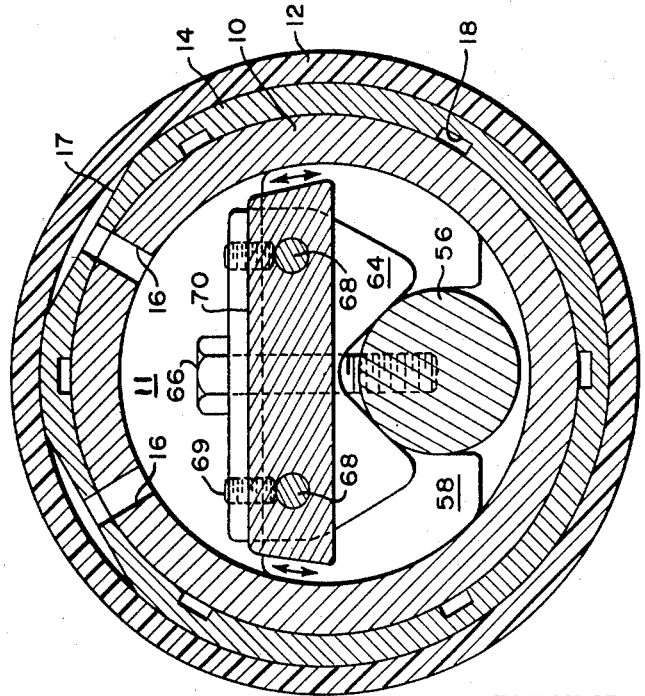
INVENTORS
JAMES O. GALLANT
GEORGE P. KNAPP
FRANCIS A. DEPUY
BY
Kenway, Jenney & Hildreth
ATTORNEYS June 23, 1970   J. O. GALLANT ET AL   3,516,135
ROLL WITH VIBRATION DAMPING MEANS Filed April 16, 1968   2 Sheets-Sheet 2

INVENTORS
JAMES O. GALLANT
GEORGE P. KNAPP
FRANCIS A. DEPUY
BY
Kenway, Jenney & Hildreth
ATTORNEYS United States Patent Office 3,516,135
Patented June 23, 1970

3,516,135
ROLL WITH VIBRATION DAMPING MEANS
James O. Gallant, Rehoboth, George P. Knapp, Waban, and Francis A. Depuy, Somerset, Mass., assignors to Mount Hope Machine Company, Incorporated, Taunton, Mass., a corporation of Massachusetts
Filed Apr. 16, 1968, Ser. No. 721,678
Int. Cl. B21b 13/02
U.S. Cl. 29—116                                      10 Claims

ABSTRACT OF THE DISCLOSURE

A roll has means for damping vibrations, comprising a paddle which is mounted by a spring suspension within a fluid-filled chamber inside a stationary axle. The paddle has small clearances with the walls of the chamber and absorbs vibratory energy from the roll by pumping fluid through these clearances at high velocity. The effective spring rate of the paddle suspension may be selected such that the natural frequency of vibration of the paddle equals that of the roll. The roll may have anti-friction or fluid bearings; if the latter, the chamber serves as a reservoir for the fluid supply.

BACKGROUND AND BRIEF DESCRIPTION OF THE INVENTION

The present invention is concerned with the persistent problem of vibration in rolls, and is particularly directed to, although not limited in application to, table rolls used in Fourdrinier machines for the drainage of water from suspensions of paper fibers carried by a travelling screen or wire. The recognition in recent times of the desirability of reducing the diameters of table rolls has aggravated the vibration problem because the rigidity of these rolls is correspondingly lessened. Good workmanship, careful attention to tolerances, and the use of conventional balancing techniques alleviate but do not eliminate harmful vibration.

In the case of water-lubricated table rolls, in which a fluid flow forms a bearing between the rotating roll sleeve and the stationary axle, vibration in the first natural mode of bending has been observed in nearly all cases. The amplitude is often great enough to make the rolls impractical for use in a paper machine. Vibration may occur over a speed range of several hundred feet per minute, beginning at the critical speed of the roll, that is, the speed corresponding to the natural frequency of roll vibration. Unlike conventional table rolls, small-diameter table rolls are normally operated above this critical speed.

The design of a water-lubricated table roll is preferably such that the annular spaces bounded by the axle on the inside, the roller sleeve on the outside, and bearing rings at the roll ends and intermediate points, are normally only partly full of water. This is accomplished by providing enough clearance over the bearing rings and through the fluid bearing surfaces themselves, e.g., by means of return ports, to maintain a sufficient flow of exhaust water from the ends of the roll. This partly full condition is desired because otherwise the contact of the rotating water with the stationary axle causes turbulence, which requires substantially more power to turn the roll. On the other hand, the roll is found to be subject to vibration, often of severe amplitude, at a frequency equal to the first natural frequency of the roll vibrating as a beam. This vibration is not caused by unbalance of the cover, the only rotating part, since the frequency is unrelated to the rotational speed. Further, this vibration is primarily in a vertical plane, whereas imbalance causes vibration in all planes passing through the roll axis.

It is thought that this vibration is caused by oppositely moving waves running circumferentially up and down the sides of the roller sleeve and reinforcing themselves as they meet at the top and bottom. Acceleration forces are substantially equal on both sides of the roll, so the circumferentially travelling waves propagate at equal speed. The surging causes vibration and vice versa, so that the process is self-sustaining. The frequency is equal to the natural frequency of the roll, since only at this frequency does a small periodically varying disturbing force produce a substantial amplitude.

Horizontal vibration is not ordinarily encountered in use in the Fourdrinier because the suction between the table roll and the wire grips it firmly to the wire, which is tautly tensioned in the horizontal direction.

Similar vibration is observed in a roll having mechanical anti-friction bearings supporting an annular roller sleeve. In one design, a glass fiber and epoxy sleeve is supported by two steel spools placed end to end, which are supported by bearings at their outboard ends and by a bearing which they share in common at the center. These steel spools have an inherent sag of their own. Thus, when the three bearings are co-axial, the space between the confronting ends of the spools tends to open at the top of the roll and close at the bottom. This stresses the fiber glass-epoxy cover in this vicinity, and the stress in any given fiber varies cyclically as the roll rotates. Since this material is not highly elastic, the point of maximum strain tends to be dragged around in the direction of roll rotation. The angle between the point of maximum strain and the bottom of the roll increases as the roll speed increases. Finally, this point is dragged over the top, and beyond that speed, rotates in the direction of roll rotation but not necessarily at the same speed as the roll. This is the phenomenon known as whip. This can also occur in a plain steel roll, since even steel is not perfectly elastic.

It is the general object of the present invention to provide means for damping the vibrations of a roll, and it is a specific object to dampen vibrations in a high-speed roll such as the table roll of a Fourdrinier machine. Further objects and advantages will appear as the following description proceeds.

We carry out our invention in conjunction with a roll having a stationary axle on which an annular roller is rotatably mounted, either by means of fluid bearings or mechanical antifriction bearings. The axle is provided with a fluid chamber, in which a paddle-shaped mass is suspended by resilient means or springs, with a small clearance from the sidewalls of the chamber. The paddle is solely supported by the resilient means, and is free to vibrate within the fluid. When roll vibration occurs, relative motion is set up between the paddle and the axle. This relative motion pumps fluid back and forth through the clearance spaces between the paddle and the axle, and as all of the energy involved in this pumping action is dissipated, the vibratory energy of the roll is absorbed.

If the paddle could be freely or seismically suspended, it would be equally effective in absorbing vibration at all frequencies. However, this is unnecessary because the major vibrations of the roll occur only at the first natural frequency of the roll vibrating as a beam on its end supports.

In a preferred embodiment of the invention, the spring rate of the resilient means supporting the paddle is tuned so that the mass of the paddle will vibrate at the same natural frequency as the roll. This greatly magnifies the response of the paddle, so that its relative motion can easily be several times the amplitude of the roll vibration, correspondingly increasing the amount of energy absorbed per cycle.

A preferred form of suspension incorporates parallel rods which extend in one or both directions longitudinally of the axle from the paddle, which is located in the longitudinal center of the roll where the maximum amplitude of vibration occurs. The outboard ends of the rods are supported fixedly within the axle by brackets or similar mountings. The system may be tuned by selecting the locations of the rod-supporting brackets so that the effective lengths of the rods tunes the system to the natural frequency of the roll, which in turn depends on its own length.

In a variation of the foregoing arrangement, the elongated paddle-shaped mass may be sufficiently long so that its own elasticity when supported at its ends or elsewhere becomes a factor, and possibly even the principal factor, in determining the elastance of the damper so that the function of the support rods becomes that of merely locating and supporting the mass. The tuning of the damper then becomes mainly a function of the distributed mass and elastance of the paddle.

In the application of the improved vibration-damping system to a fluid bearing roll, the interior of the axle may serve both as a reservoir for supplying fluid to the bearing clearances between the axle and the sleeve, and as the damping fluid chamber. In application to a roll having mechanical antifriction bearings, the sealed interior of the hollow axle may again be used as the damping fluid chamber, or separate wall means may form a chamber of shorter length within the axle, if desired.

In the accompanying drawings:

FIG. 1 is a fragmentary view in side elevation, and partially in section, showing a fluid bearing roll embodying one form of the invention;

FIG. 2 is a sectional view taken along line 2—2 in FIG. 1, looking in the direction of the arrows;

FIG. 5 is a sectional view of a portion of a third embodiment.

Figure 3:
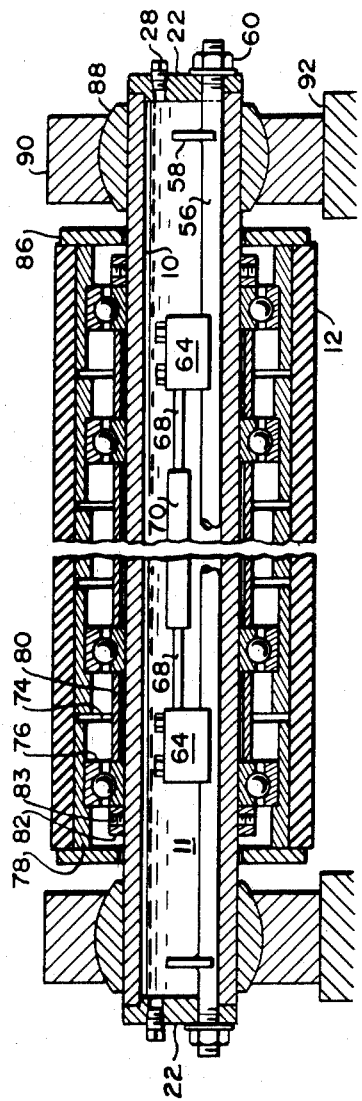
FIG. 3 is a sectional view in side elevation showing a roll embodying another form of the invention.

An embodiment of the invention in a fluid bearing axle roll is illustrated in FIGS. 1 and 2. The roll includes a tubular axle or support 10 of circular cylindrical cross-section, whose interior wall forms a fluid chamber 11. The axle is mounted in a horizontal position by means of mounting brackets 44 at either end, having lifting rings 52 for convenience in installing the roll. In the form shown, a mounting base 46 is pivotally connected to each bracket 44, and height adjustment to level the roll is provided by a threaded stud 48 interconnecting the parts 44 and 46. A cam (not shown) is operable by an adjusting member 50 for a quick adjustment of the height of the stop contacted by the stud 48. This mechanism is conventional and forms no part of the present invention, so that no further detailed description thereof is believed necessary.

Extending lengthwise through the axle 10 is a tension rod or bolt 56 having threaded ends on which nuts 60 are received. Stout abutments or end plates 22 are mounted in sealing engagement on the opposite ends of the axle, and have openings through which the bolt 56 passes. These end plates are aligned with the axle by means of pins 24. Threaded ports 26 are provided in either abutment 22 for supplying a flow of fluid to the chamber 11; one of these openings is shown closed by a plug 28. The tension bolt 56 extends parallel to, but is spaced vertically beneath, the major longitudinal axis of the roll, which coincides with its neutral axis of transverse bending. Upon tightening of the nuts 60, the rod 56 is subjected to tension, placing the axle under an eccentric longitudinal compressive force. This force is used to remove longitudinal curvature from the roll when a working load is applied, as is more fully described in U.S. Pat. No. 3,099,072 issued July 30, 1963 to J. D. Robertson et al., and U.S. Pat. No. 3,094,771 issued June 25, 1963 to J. D. Robertson. The nuts 60 are tightened to deflect the axle to an upwardly convex form when the roll is unloaded, so that the center will be in line with the ends when the load is applied. A pair of plates 58 are welded or otherwise attached near the ends of the bolt 56, and have surfaces conforming to the internal walls of the axle 10 to prevent the bolt from rotating when the nuts 60 are tightened. It is to be understood that the tension bolt 56 is not necessary or essential to the practice of the present invention; but it is considered desirable for use with relatively long straight rolls such as the table rolls of a Fourdrinier machine, because this expedient makes it feasible to reduce the roll diameter.

An annular roller sleeve 12, of such material as may be suitable for the particular use of the roll, is received circumferentially about the axle 12 with an annular clearance. This sleeve is rotatable on the axle and serves to support a travelling sheet, web, or band, such for example as the wire or screen of a Fourdrinier machine, which would rest on the vertical top of the sleeve. In the construction shown, the sleeve should be substantially rigid against distortion under the applied load, and is supported by fluid bearings like those described and claimed in U.S. patent application Ser. No. 505,101 for a "Fluid Bearing Table Roll," filed by J. D. Robertson on Oct. 15, 1965. Pairs of orifices 16 are formed through the axle 10 and a series of bearing rings 14, which are fixed in axially-spaced relation along the axle. The orifices are arranged in two longitudinal rows, each parallel to the axis of the roll, and these rows define a minor arcuate sector of the axle between them. The load is intended to act vertically in the illustrated case, along a vertical plane passing through the axis of the roll, which plane bisects the arc defined between the rows of orifices 16. These orifices serve to distribute a flow of water or other lubricating fluid, supplied to the chamber 11 through the open one of the ports 26, to annular clearance spaces defined between the outer circumferences of the rings 14 and the interior surface of the sleeve 12. The clearance space is small, and therefore does not appear in the drawings. Distribution of the bearing fluid is improved by forming flats 17 in the surfaces of the bearing rings 14 over the exit ends of the orifices 16.

A series of return ports 18 are formed about the inner circumferences of the bearing rings 14 to maintain a free flow through the enlarged annular clearance spaces defined between the axle 10 and sleeve 12 over those portions of the axle not occupied by the bearing rings 14, and thence out through the ends of the sleeve.

It is desirable that these clearances be only partly full of liquid to reduce turbulence, and thereby reduce the power required to turn the roll.

The flow of bearing fluid travels toward either end of the sleeve 12, at which thrust rings 30 and thrust bearings 32 are provided to locate the sleeve axially with respect to the axle. The fluid escapes through an annular clearance 40 formed between the elements 30, 32 and the axle, and is drained through a passage 38 in a collar 42. The collar has an arcuate recess 36 for draining any fluid escaping between the rings 30 and 32. The fluid may then be recirculated by a pump to the inlet port 26, or discarded, as desired.

A roll constructed as thus far described is subject to substantial vibration along vertical axes at the first natural frequency of the roll vibrating as a beam, for reasons previously explained. To dampen this vibration, we provide a paddle 70 which is mounted within the chamber 11 transversely to the direction of major vibration, that is, in a horizontally-extending position. The paddle is mounted on resilient suspension means or springs comprising two pairs of parallel rods 68, whose inboard ends are received loosely in holes in the paddle and which extend in opposite directions longitudinally of the roll.

The outboard ends of the rods are affixed to the axle assembly by means of a pair of brackets 64.

Alternatively, the paddle 70 may be sufficiently long so that its own resilience when supported on its ends tunes the system to the desired frequency. Rods 68 then are shortened to the point where they constitute substantially rigid supports. Alternatively, the resilient mass could be supported in other ways, such as at its center with the ends free.

The brackets are attached in the illustrated construction, by screws 66 to the tension bolt 56, which vibrates as a unit with the axle. The rods can, however, be attached directly to the axle, as would be necessary if a tension bolt is not used. The rods are secured in place in the brackets 64 by means of set screws 69 (FIG. 2).

Because the roll vibrates with substantial amplitude only at its first natural frequency and primarily in vertical directions, it is not necessary that the paddle be freely or seismically suspended so that it can vibrate equally at all frequencies. Horizontal movement is not ordinarily necessary, in view of the minor degree of horizontal vibration of the roll, and this restraint makes it feasible to provide only small clearances between the edges of the paddle and the inner surface of the axle, as appears in FIG. 2. Reduction of these clearances increases the velocity of fluid flow around the edges of the paddle, therefore enhancing the damping action. If horizontal as well as vertical damping is required, a cruciform or other suitable paddle could be used to force horizontal as well as vertical pumping of the fluid through clearances; but the clearances would have to be larger than the maximum amplitude of vibration, to prevent the paddle from striking the walls of the axle 10.

As vertical vibration of the roll commences, the resilience of the rods 68 and/or paddle 70, and the mass of the paddle 70, cause a relative vertical motion between the paddle and the roll, which pumps the fluid in the chamber 11 back and forth around the edges of the paddle and absorbs the vibratory energy. We have found this system highly effective in reducing roll vibration.

The spring rate of the rods 68 and/or the length of paddle 70 is preferably adjusted to tune the paddle to the same natural frequency as the roll. This can be done readily by selecting the location of the brackets 64 along the tension bolt 56 to obtain the corresponding effective lengths of the rods 68 and/or paddle 70. In general, the natural frequency of a mass suspended on a spring is equal to the square root of its spring constant divided by its mass, divided by 2 pi. For either the roll, or the rods 68 and/or paddle 70, the spring constant will be related to the relevant transverse moment of inertia, modulus of elasticity, and length. If the suspension system is properly tuned, the amplitude of vibration of the paddle is greatly magnified, and its motion relative to the axle can be several times as great as the amplitude of vibration of the roll itself. Tuning therefore greatly increases the ability of the paddle to absorb vibratory energy.

Figure 4:
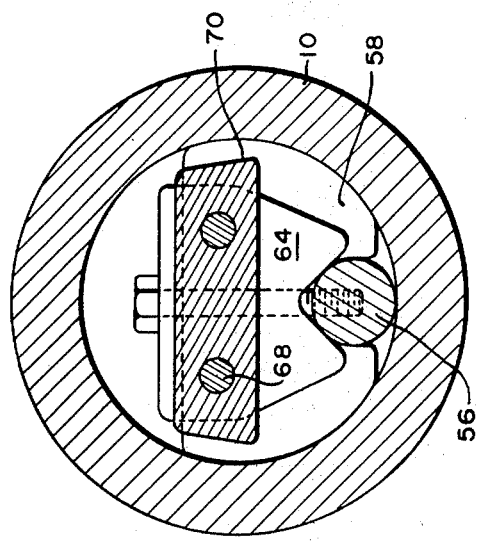
FIG. 4 is a sectional view in end elevation of an axle and damping means forming a portion of the roll of FIG. 3.

Another embodiment of the invention is shown in FIGS. 3 and 4, in a roll having anti-friction rather than fluid bearings. Parts similar to those of the preceding embodiment are similarly numbered. The axle 10 is in this case uninterrupted by orifices, and either end abutment 22 is normally closed by a plug 28, so that the chamber 11 is sealed. The chamber is nearly but not completely filled with damping liquid, to provide for thermal expansion. The axle carries a series of annular spools 78, mounted in end-to-end relation. Each spool is rotatably mounted on a ball bearing unit 76, spaced along the axle by annular spacers 80 which provide for small clearances 74 between spools. A pair of locking rings 82 are fixed by set screws 83 at opposite ends of the assembly of spools and bearings for securing the assembly in place. A pair of annular caps 86 are fastened to the outermost ones of the spools 78 by suitable means (not shown), and incorporate seals of conventional type (not shown) to exclude water. The annular sleeve 12 is engaged circumferentially about all of the spools, connecting them for rotation in unison with the sleeve about the support 10. In this construction, the ends of the axle are supported by spherical bearing elements 88, which are mounted in bearing members 90 on fixed supports 92, and provide for canting of the ends of the axle as its shape is adjusted by turning the nuts 60. The operation of the damping paddle 70 is similar to that of the embodiment of FIGS. 1 and 2.

Referring now to FIG. 5, a third embodiment of the invention is shown. The illustration is a portion of the embodiment shown in FIG. 1 with the exception of certain changes therein which will now be described. The embodiment consists of the same axle or support 10, an annular roller sleeve 12, and a tension rod or bolt 56, all as shown in FIG. 1. However, the difference between this embodiment and that of FIG. 1 is that the vibration damping paddle member is now mounted at its center, and not at its ends as shown in FIG. 1.

To this end, the damping paddle member 100 is supported approximately at its center by means of a mounting block 102 which has one end suitably curved to match the curvature of the tension rod 56. A bolt 104 passes through member 100 and a suitably provided hole in the block 102, and is threaded into the tension rod 56.

The damping paddle member 100 is shown in this instance as being laminated. That is, it comprises a plurality of discrete layers, for example, layers 106, 108 and 110, whose faces lie against each other in the manner of a leaf spring. At the other ends of the laminations 106–110, suitable slots 112 are provided in laminations 106 and 108, and a hole in lamination 110, through which pass the bolts 114, the bolts being threaded into tuning weights 116 which are selected for properly tuning the member 100 to the desired frequency, bearing in mind the mass of the laminations 106, 108, 110, their elastance, and their fundamental frequencies. In order not to restrain the laminations 106–110 from slipping with respect to each other during vibration, suitable spring means are provided between the weights 116 and the upper lamination 106, the spring means in this instance taking the form of Belleville springs 118. While other spring means may be used, such as helical compression springs, or U-shaped leaf springs, the Belleville type of spring is preferred because once it is adjusted to operate in the flat region of its deflection-force curve, the force exerted will then remain approximately uniform regardless of the setting of the bolts 114, and regardless of any wear which may occur between the laminations 106–110. Thus, the damping due to interfacial friction will remain constant. Of course, if desired, timing weights 116 need not be used, the physical characteristics of the laminations 106–110 then being chosen initially for proper damping effects.

What we claim is:

1. In combination, a roll and means for adapting the roll to be vibration-damped with respect to vibrations parallel to an axial plane of major vibration thereof, said roll comprising an axle, means supporting said axle in a stationary position, an annular roller sleeve extending circumferentially about said axle, bearing means rotatably mounting said sleeve on said axle, said axle being provided with internal wall means forming a chamber adapted to contain viscous fluid, and said vibration damping means comprising a movable paddle member received in said chamber and extending along an axial plane transverse to said plane of major vibration of said roll, and means resiliently suspending said paddle member in a stationary position for vibration parallel to said plane of major vibration, said paddle forming narrow clearances from said wall means in said transverse plane, said paddle member being adapted to pump viscous fluid contained in said chamber through said clearances for absorbing vibrational energy from said roll.

2. A roll and vibration damping means as recited in claim 1, in which the spring rate of said resilient means is selected to tune said paddle to a natural frequency of vibration at least approximately equal to that of the roll.

3. A roll and vibration damping means as recited in claim 1, in which said resilient means comprise rod means extending longitudinally of said axle and parallel with the axis thereof, said rod means being supported at one end thereof by said axle and mounting said paddle at an opposite end thereof.

4. A roll and vibration damping means as recited in claim 3, in which there are at least two of said rod means received at first ends thereof in holes at opposite ends of said paddle and extending in opposite directions longitudinally of said axle, together with means forming cantilever mountings in said axle of second ends of said rod means outboard of said paddle.

5. A roll and vibration damping means as recited in claim 4, in which said rod means comprise two pairs of parallel rods having their longitudinal axes in a common plane.

6. A roll and vibration damping means as recited in claim 3, in which the effective spring rates of said rod means are selected to tune the natural frequency of vibration of said paddle at least approximately equal to the first natural frequency of vibration of said roll.

7. A roll and vibration damping means as recited in claim 1, in which at least portions of the outer surface of said axle have a circular cross-section, said sleeve forming annular clearance spaces about said portions, said axle being formed with conduit means for delivering a flow of fluid into said chamber, said axle further being formed with orifices for delivering fluid from said chamber into said clearance spaces to form fluid bearing means rotatably mounting said sleeve on said axle.

8. A roll and vibration damping means as recited in claim 8, in which said axle is formed with two longitudinal rows of said orifices defining between them a wedge-shaped minor arcuate sector of said axle, the remaining major arcuate sector of said axle being imperforate.

9. A roll and vibration damping means as recited in claim 1, said axle being supported with a major axis thereof horizontal, said paddle member forming its minimum clearances from said wall means in two horizontally-spaced regions lying in said transverse plane.

10. The roll and vibration damping means of claim 1 in which said paddle member is mounted at its center within said chamber, the ends of said paddle member being free to vibrate parallel to said axial plane of major vibrations.

References Cited
UNITED STATES PATENTS

| | | |
|---|---|---|
| 2,636,399 | 4/1953 | O'Connor. |
| 3,119,324 | 1/1964 | Justus. |
| 3,131,625 | 5/1964 | Kusters et al. |

WILLIAM I. PRICE, Primary Examiner

L. G. MACHLIN, Assistant Examiner

U.S. Cl. X.R.

188—1